Aug. 22, 1939.  G. J. STEPHEN  2,170,067
FISHING LURE
Filed May 27, 1938
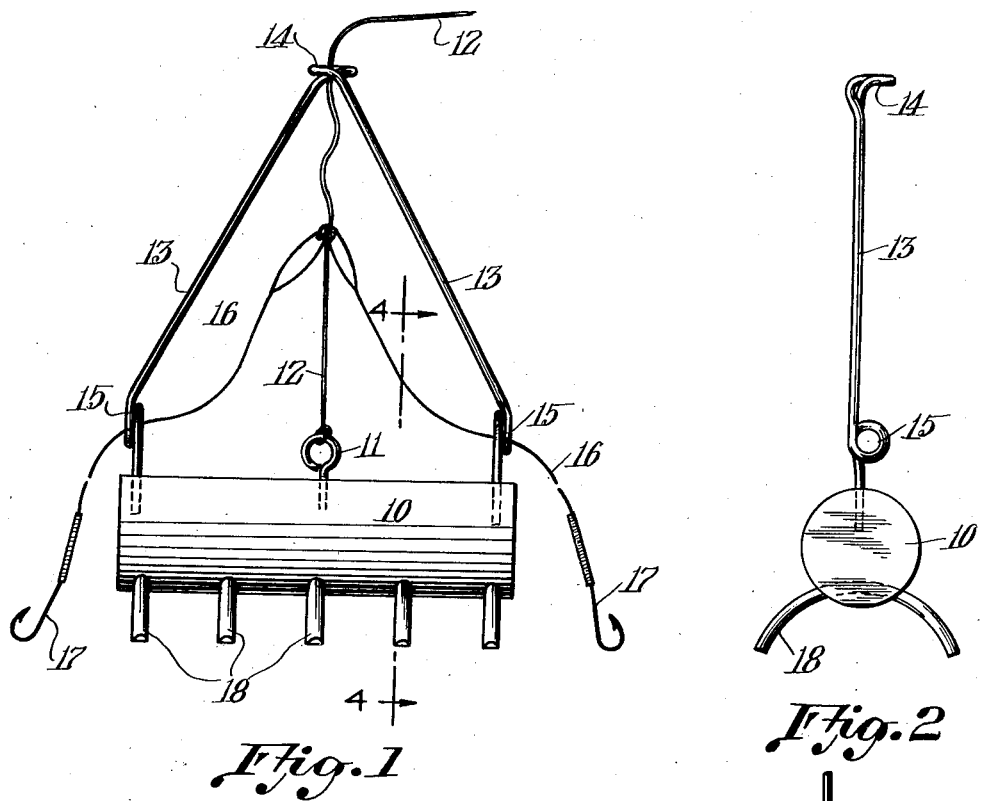
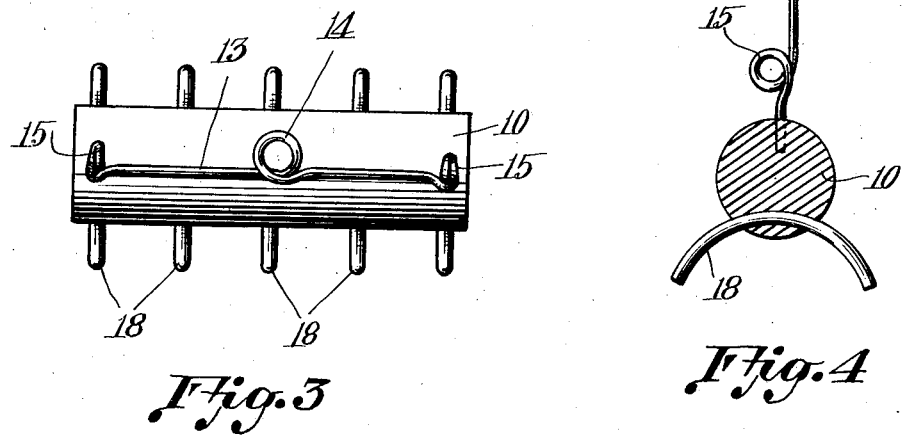
INVENTOR.
George J. Stephen
BY George Schlatt
ATTORNEY.

Patented Aug. 22, 1939

2,170,067

UNITED STATES PATENT OFFICE 2,170,067

FISHING LURE

George J. Stephen, Richmond Hill, N. Y.

Application May 27, 1938, Serial No. 210,307

6 Claims. (Cl. 43—28)

This invention relates to improvements in fishing lure, and more particularly to combination spreader and sinker.

Objects

Among the principal objects which the present invention has in view are: to provide a simplified construction of fishing implement whereby a fisherman may easily rig up a line in minimum time; to provide a combination spreader and sinker of substantially one-piece construction; to provide a combination spreader and sinker having means whereby undersurface or bottom fishing is easily accomplished; to prevent seaweeds and other underwater growth from becoming entangled in the spreader and sinker; to be enabled to stir up the undersurface or bottom to lure imbedded fish to the bait on the hooks; to be enabled to conveniently secure the fishing line and hooks to the spreader and sinker and not requiring the usual skill to rig up fishing tackle; to be enabled to manufacture the spreader and sinker at a minimum cost; to secure simplicity of construction and operation; and to obtain other advantages and results as may be brought out in the following description.

Drawing

Figure 1 is a front elevation of my improved combination spreader and sinker, and illustrates a fishing line and hooks as part thereof;

Figure 2 is a side elevation of the same;

Figure 3 is a top plan view; and

Figure 4 is a vertical sectional view shown as taken on line 4—4 of Figure 1.

Description

In the specific embodiment of the invention illustrated in the drawing the lure comprises in general a horizontally disposed weighted body portion or sinker 10 of any suitable shape, and here shown to be cylindrical. As usual, the sinker is of lead or an alloy of lead and other element to give it the proper characteristics of weight, resistance to chemical action in the water, and ease of molding in manufacture. Midway of the length of the sinker 10 is provided an attaching means, such as eye 11 for the fish line 12 conveniently tied at its lower end to the said eye and enabling the sinker to be raised and lowered and dragged in its position shown substantially normal or transverse to the general direction of the line when tensioned. For convenience the portion of the sinker from which eye 11 projects will be designated the top of the sinker. The eye is provided with a stem imbedded and retained within the sinker by molding the sinker with the eye and stem in position.

Next the ends of the sinker and projecting from the same at the said top side thereof are the ends of a fixed bail 13 which extends a considerable distance from the sinker and provides a middle loop 14 above the eye 11 enabling the line 12 to extend straight through the loop to the eye. The said bail has a relatively gradual slope from loop 14 to the outer ends of the sinker and will accordingly tend to shed any seaweed which may engage the same. Furthermore, said bail provides pig-tail loops 15 next to the entry of the ends of the bail into the sinker, said loops opening in a direction lengthwise of the sinker so as to pass the snell 16 therethrough and thus position hook 17 in spaced relation to each other beyond opposite ends of the sinker. It is to be understood that the snells 16 are attached at their upper ends to the line 12 at a part thereof between eye 11 on the sinker and loop 14 at the middle of the bail. Accordingly, the nibble by the fish will be transmitted directly to the line without having to disturb the sinker, and accordingly the fisherman has a very sensitive communication directly to the hook and a far better opportunity to snag the fish or hook it at the moment of nibbling. It likewise may be stated in passing, that the ends of the bail are imbedded in the material forming the sinker so as to be permanently retained therein. The attachment of the line to the sinker and the extension of the bail to a considerable distance along the line enables the sinker to be held steady, and prevents twisting, and the provision of opposite pig-tail loops 15 at the ends of the sinker prevents the snells from twisting and the hooks from snagging each other or snagging the opposite snell. The construction shown is one which enables the most inexperienced to readily assemble the sinker and snells on a line and to obtain the best results.

I preferably also provide next the bottom part of the sinker a plurality of flukes or tines 18 here shown as comprising arcuate pieces of wire the mid portions of which pass through the lower part of the sinker transverse thereto with the ends of the arcs projecting substantially equal distances from the sinker and directed downwardly. These tines form legs or feet by which the sinker may be supported in its horizontal position and also comprises a means by which the bottom may be stirred when the sinker is dragged across the same. The shape of these tines is such that they will tend to shed any seaweed.

I claim:

1. A lure comprising an elongated sinker having means for attaching a line midway of the length of the sinker, and means for engaging said line at a distance from the sinker with the line passing freely through said means, and snell guides next the ends of said sinker.

2. A lure comprising an elongated sinker having means for attaching a line midway of the length of the sinker, and means for engaging said line at a distance from the sinker with the line passing freely through said means, and snell guides next the ends of said sinker at the side thereof having the line attaching means.

3. A lure comprising a sinker, a bail having ends thereof secured to the sinker at separated points at the top of said sinker, said bail having snell guides adjacent the sinker and having a line guide at a mid portion of said bail and at a distance from the said sinker.

4. A lure comprising a sinker, a bail having ends thereof secured to the sinker at separated points at the top of said sinker, said bail having snell guides adjacent the sinker and having a line guide at a mid-portion of said bail and at a distance from the said sinker, said sinker having a line attaching eye at the same side thereof as the ends of the bail and midway between said ends, said bail providing for a length of line between said eye and the line guide of the bail.

5. A lure comprising a sinker, a bail having ends thereof secured to the sinker at separated points at the top of said sinker, said bail having snell guides adjacent the sinker and having a line guide at a mid-portion of said bail and at a distance from the said sinker, said sinker having a line attaching eye at the same side thereof as the ends of the bail and midway between said ends, said bail providing for a length of line between said eye and the line guide of the bail, and snells passing through said snell guides and attached to the line between the said eye and guiding loop.

6. A lure comprising a horizontally disposed elongated sinker having a bail at its upper side and having means for attaching a line at said upper side, said bail engaging the line for holding the sinker level when the line is taut, and a plurality of tines next the bottom of the sinker projecting outwardly downward therefrom at opposite sides thereof.

GEORGE J. STEPHEN.